United States Patent
Kisley et al.

(10) Patent No.: US 11,575,520 B2
(45) Date of Patent: Feb. 7, 2023

(54) KEY BLOCK ENHANCED WRAPPING

(71) Applicant: INTERNATIONAL BUSINESS MACHINES CORPORATION, Armonk, NY (US)

(72) Inventors: Richard Victor Kisley, Charlotte, NC (US); Michael Miele, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/120,326

(22) Filed: Dec. 14, 2020

(65) Prior Publication Data
US 2022/0191039 A1 Jun. 16, 2022

(51) Int. Cl.
*H04L 9/32* (2006.01)
*H04L 9/06* (2006.01)
*H04L 9/08* (2006.01)

(52) U.S. Cl.
CPC .......... *H04L 9/3242* (2013.01); *H04L 9/0637* (2013.01); *H04L 9/0825* (2013.01); *H04L 9/0869* (2013.01)

(58) Field of Classification Search
None
See application file for complete search history.

(56) References Cited

U.S. PATENT DOCUMENTS

| | | |
|---|---|---|
| 4,918,728 A | 4/1990 | Matyas et al. |
| 6,708,273 B1 * | 3/2004 | Ober .................. G06F 8/60 713/189 |
| 7,281,068 B2 | 10/2007 | Davis et al. |
| 7,392,384 B2 | 6/2008 | Hopkins et al. |
| 8,615,081 B2 | 12/2013 | Arnold et al. |
| 8,739,297 B2 | 5/2014 | Arnold et al. |
| 8,856,520 B2 | 10/2014 | Arnold et al. |
| 8,953,792 B2 | 2/2015 | Arnold et al. |
| 9,178,703 B2 | 11/2015 | Arnold et al. |

(Continued)

OTHER PUBLICATIONS (NIST Special Publication 800-108 Recommendation for Key Derivation Using Pseudorandom Functions), Computer Security Division Information Technology Laboratory, Oct. 2009 (Year: 2009).*

(Continued)

*Primary Examiner* — Eleni A Shiferaw
(74) *Attorney, Agent, or Firm* — Cantor Colburn LLP; Edward Wixted

(57) ABSTRACT

Aspects of the invention include providing a clear key with an attribute that controls usage of the clear key. The clear key includes key data in at least a first 8-byte section and second and third 8-byte sections and a wrapping key for wrapping the clear key. The computer-implemented method further includes chaining the first, second and third 8-byte sections together with zeroes for those 8-byte sections that are unpopulated into chained key data, deriving encryption and authentication keys from the wrapping key, calculating an authentication code over the clear key and the attribute using the authentication key, executing encryption over the chained key data using the encryption key to generated encrypted chained key data and adding the authentication code, the attribute and the encrypted chained key data to form a key block.

20 Claims, 7 Drawing Sheets

(56) References Cited

U.S. PATENT DOCUMENTS

| | | |
|---|---|---|
| 9,252,944 B2 | 2/2016 | Arnold et al. |
| 9,288,051 B2 | 3/2016 | Arnold et al. |
| 2004/0003246 A1* | 1/2004 | Hopkins ............... H04L 9/0637 |
| | | 713/168 |
| 2005/0149739 A1 | 7/2005 | Hopkins et al. |
| 2012/0185699 A1* | 7/2012 | Arnold ................. H04L 9/0822 |
| | | 713/189 |
| 2017/0024584 A1* | 1/2017 | Chhabra ................ G06F 21/57 |
| 2020/0082088 A1* | 3/2020 | Muthukumaran .... H04L 9/0866 |
| 2020/0380149 A1* | 12/2020 | Ramesh .............. G06F 21/6218 |
| 2021/0124818 A1* | 4/2021 | Muthukumaran .... H04L 9/0894 |
| 2021/0157904 A1* | 5/2021 | Bursell .................. H04L 9/085 |

OTHER PUBLICATIONS

Housley (Cryptographic Message Syntax), Network Working Group, Jun. 1999. (Year: 1999).*

* cited by examiner

KEY BLOCK ENHANCED WRAPPING

BACKGROUND

The present invention generally relates to key block enhanced wrapping and, more specifically, to key block enhanced wrapping methods.

Cryptography is the transformation of intelligible information into apparently unintelligible form in order to conceal the information from unauthorized parties. Cryptography is used for various purposes, such as to protect information transmitted through communications networks. It can also be the most economical way to protect stored data. Cryptographic procedures can be used not only to protect the privacy of data, but also the integrity of data.

The cryptographic transformation of data is ordinarily defined by a selected algorithm or procedure under the control of a key. Since the algorithm is normally public knowledge, protection of the transformed or enciphered data depends on secrecy of the key. Thus, the key must be kept secret to prevent an opponent from simply using the known algorithm and key to recover the enciphered data. The protection of the data therefore hinges on the protection of secret keys.

SUMMARY

Embodiments of the present invention are directed to a computer-implemented method of enhanced key wrapping. A non-limiting example of the computer-implemented method includes providing a clear key with an attribute that controls usage of the clear key. The clear key includes key data in at least a first 8-byte section and second and third 8-byte sections and a wrapping key for wrapping the clear key. The computer-implemented method further includes chaining the first, second and third 8-byte sections together with zeroes for those 8-byte sections that are unpopulated into chained key data, deriving encryption and authentication keys from the wrapping key, calculating an authentication code over the clear key and the attribute using the authentication key, executing encryption over the chained key data using the encryption key to generated encrypted chained key data and adding the authentication code, the attribute and the encrypted chained key data to form a key block.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
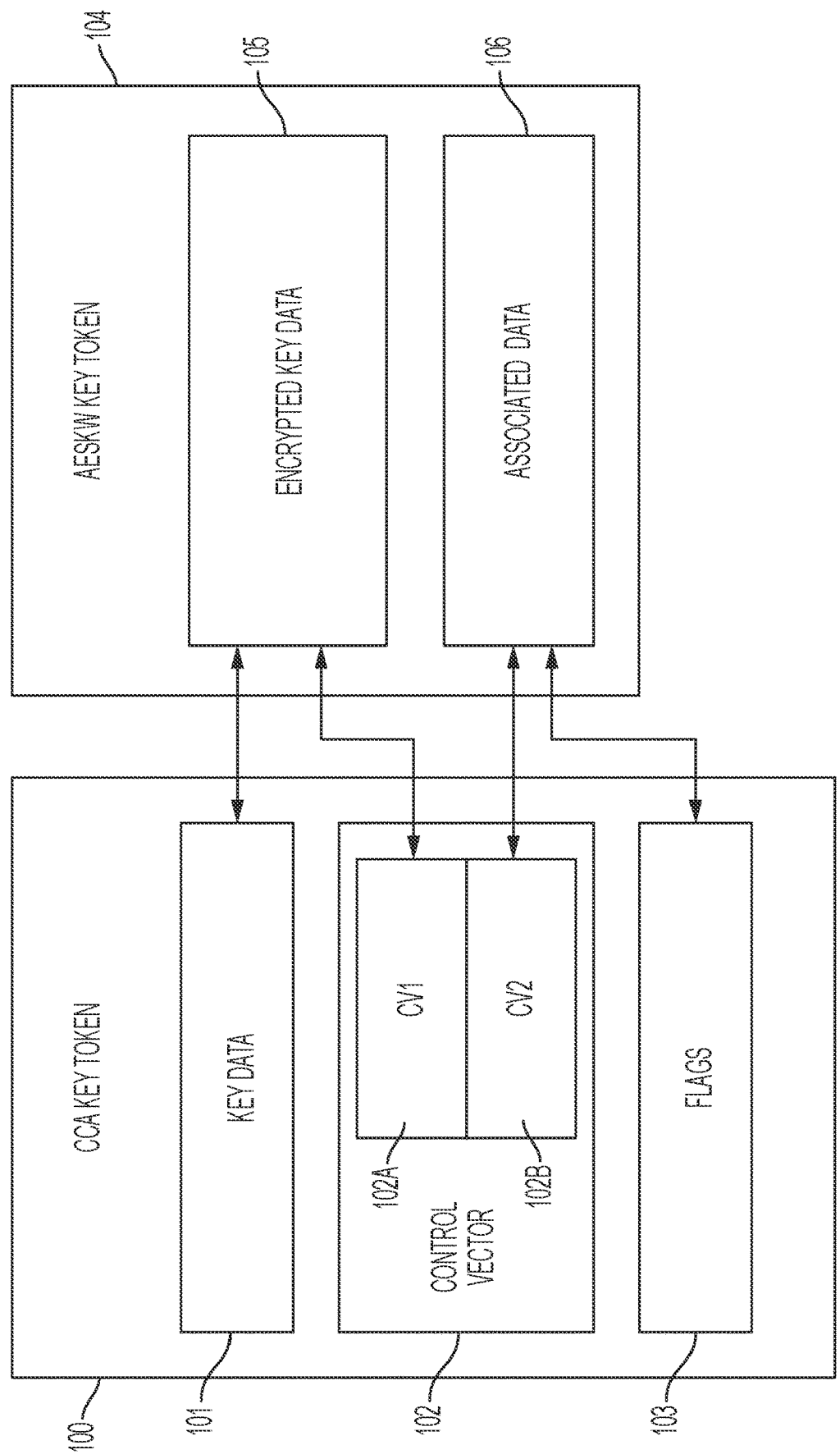
FIG. 1 depicts a common cryptographic architecture (CCA) key token and an advanced encryption standard (AES) key wrapping (AESKW) key token for AES key wrapping for a CCA key token in accordance with one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a system in which key block and wrapping methods are enhanced with an integrity check and key obfuscation. The integrity check involves an offset of the 64-byte structure now having an 8-byte triple data encryption standard cipher-based message authentication code (TDES-CMAC). The key obfuscation is characterized in that all three sections of the key block used to store 8-byte sections of encrypted key material are always populated with encrypted data, thereby hiding the true length of the key. The wrapping method is characterized in that the control vector is no longer XORed into the wrapping key, a CMAC is calculated over all bytes of the key block with the clear key material as an integrity check and then placed at offset 40, the three sections of the key are chained together using SHA-256 and XOR and the three sections of the key are always encrypted and then placed back in the token always using 24-byte space.

By way of review, a control vector is a data structure that includes one or more fields of predefined values which collectively describe the intended usage of a cryptographic key with which it is associated. The control vector is specified by the key originator at key creation time. In a common cryptographic architecture (CCA) key token, key attributes are stored in the control vector, which is not encrypted. A CCA key may be wrapped using a different type of encryption, for example, AES key wrapping (AESKW), to produce an AESKW key token that holds the CCA key and its attributes. AESKW is defined in American National Standards Institute (ANSI) standard X9.102. In the resulting AESKW key token, some attributes that are not encrypted in the control vector portion of a CCA key token are moved to an encrypted portion of an AESKW key token. These attributes are split from the control vector so that some attributes from the control vector are bound to the key but not encrypted, while other attributes are encrypted along with the key itself. In various embodiments, any appropriate type of encryption may be used to wrap a CCA key.

Keys are generally encrypted when the keys are outside of a protected environment. Encrypted keys are carried in a protected data structure called a key token or a key block (hereinafter key token). An AESKW key token contains two sections: key data, which is encrypted in order to keep the key secret; and attributes, which are cryptographically bound to the key to protect against alteration, but are not encrypted and do not need to be secret. A CCA key token includes a bound but not encrypted control vector, a flag section, which is neither encrypted nor bound, and encrypted key data.

A legacy CCA key, which may include a data encryption standard (DES) key or a double-length or triple-length triple DES (TDES) key in various embodiments, may be exported to an AES-protected token for transport, and the AES-protected token may be imported to the TDES format for use on the receiving system. The CCA key at the receiving system corresponds to the CCA key on the sending system; the key and attributes in the CCA key on an importing system may be identical to the CCA key on an exporting system, with the exception of system-dependent values. When encrypted using symmetric key techniques, CCA keys are encrypted using other CCA keys, which are known as key encrypting keys (KEKs). However, The AES encryption algorithm is stronger than TDES, therefore, wrapping legacy CCA keys with AES KEKs may be performed to strengthen security of the CCA keys.

For a DES or TDES key, the control vector is a sequence of bits identical in length to the key itself, for example, either 8, 16 bytes. For example, for a 16 byte control vector, the second 8 bytes are identical to the first 8 bytes, with the exception of a field called the key form field, which identifies it as the second part of a double-length (16 byte) control vector. The control vector is made up of a number of bit fields of varying lengths. Each bit field contains values that indicate attributes of the key, and the control vector fields are checked by the CCA firmware in order to determine if the key is eligible to be used in a requested operation. Many bits in the control vector are polymorphic, meaning that their definition changes depending on the overall type of key indicated by fixed-definition fields in the control vector. Various types of information can be encoded into a control vector of a CCA key, such as the key length, and key type and subtype, which defines the operations for which the key can be used, such as: encrypting/decrypting data; computing/verifying message authentication codes; encrypting other keys (KEKs); protecting financial personal identification numbers (PINs); deriving other keys; and/or computing credit card verification values. An export control field in the control vector indicates whether the key can be exported to another system. For most key types, the control vector also includes one or more fields that indicate specific low-level operations for which the key can be used, or specific data formats for which the key can be used. The key length may be indicated by a three-bit key form field in the control vector of the CCA token.

The AESKW process encrypts the key to be wrapped, but it does not encrypt the associated data for that key. The associated data is cryptographically bound to the key so that any changes can be detected, but the associated data is transported with the key in clear text (unencrypted) form. Thus, information that may reduce security if its value is disclosed is not put in the associated data. Attributes which cause no harm by appearing in clear text (and which sometimes must be visible without decrypting the key token) are carried in the associated data, while those that must be secret for security reasons are carried in the encrypted payload. During wrapping of a CCA key in AESKW form, indications of key length are moved from the clear text control vector in the CCA token and placed in the encrypted payload of the AESKW token. This allows the strength of a cryptographic key to be hidden when the key is in encrypted token form; because shorter keys are easier to attack, knowledge of the length of a key will help an attacker identify the easiest keys to try and break.

Turning now to FIG. 1, CCA key token 100 and an AESKW key token 104 for AES key wrapping for a CCA key is shown. CCA key token 100 may include a DES or TDES key in various embodiments, and includes key data 101, control vector 102 and flags 103. Key data 101 holds the key itself, and is encrypted for transport so as to keep the key data 101 secret, but is not encrypted when the CCA key token 100 is stored on a secure system such as a hardware security module (HSM). Control vector 102 holds additional attributes and information regarding the key in key data 101 in CCA key token 100 and is not encrypted for transport, but is bound to the CCA key token 100 to protect the data in control vector 102 against alteration. Control vector 102 is made up of a first set of fields CV1 102A, which are security-critical and must be kept secret and may include a length of the key, and a second set of fields CV2 102B, which are security-critical and must be protected against alteration, but do not need to be kept secret. Flags 103 are not encrypted or bound, and hold non-security critical information regarding the CCA key token 100. AESKW key token 104 includes encrypted key data 105, which holds the key itself in addition to other information regarding the key, and is encrypted. Associated data 106 is bound to the AESKW key token 104, but is not encrypted. In order to wrap the CCA key token 100 using AES, the key data 101 is encrypted using AES in encrypted key data 105. Fields in CV1 102A in the control vector 102, which may include, for example, a key length indicator for the CCA key token 100, are encrypted in the encrypted key data 105 with key data 101. Fields in CV2 102B in the control vector 102 are used to create the bound, but not encrypted, associated data 106. Further, the non-bound flags 103 in the CCA key token 100 are bound to the AESKW key token in the associated data 106. CV2 102B and flags 103 may also be transmitted from an exporting system to an importing system separately from the AESKW key token 104 in some embodiments. In various embodiments, any appropriate fields from control vector 102 may be included in CV1 102A or CV2 102B.

Additional layout information for some embodiments of the key data 101, control vector 102, flags 103, encrypted key data 105, and associated data 106 are available. Flags 103 may be 1-byte in size and thus can support eight 1-bit flags in some embodiments.

Figure 2:
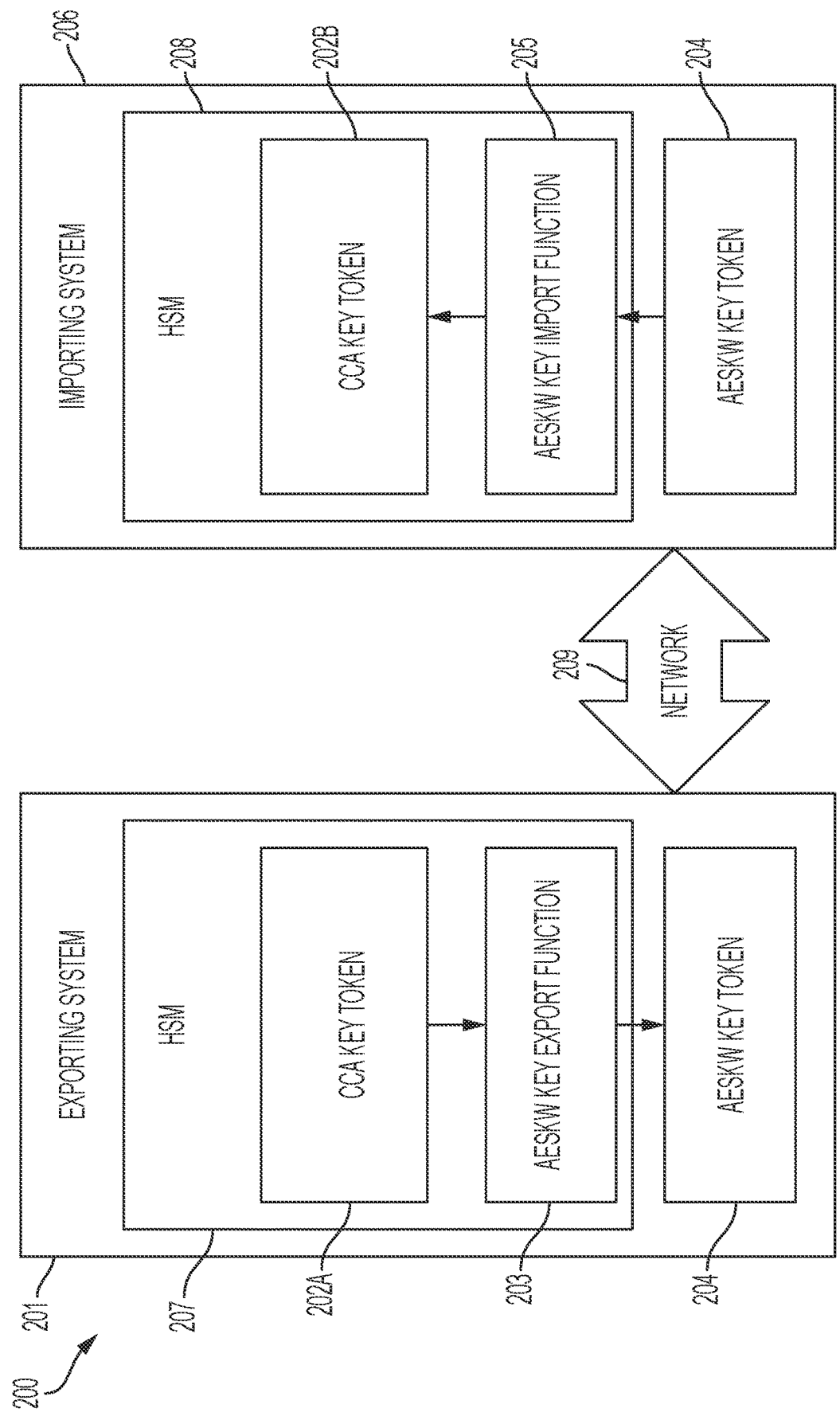
FIG. 2 depicts a system for key wrapping for a CCA key token in accordance with one or more embodiments of the present invention.

FIG. 2 illustrates an embodiment of a system 200 for AES key wrapping for a CCA key token. System 200 includes an exporting system 201 and an importing system 206, which may each include any appropriate type of computer system including, for example, a processor and a memory. A CCA key token 202A, which includes the fields shown with respect to CCA key token 100 of FIG. 1 and includes a control vector such as control vector 102, is stored in an HSM 207 on exporting system 201. In order to export CCA key token 202A, the exporting system 201 wraps the CCA key token 202A using a key export function 203, which is also located in the HSM 207 and is discussed in further detail below with respect to FIG. 3A, to generate an AESKW key token 204. The AESKW key token 204 is encrypted for transport, and includes the fields shown with respect to AESKW key token 104 of FIG. 1, and is transmitted to importing system 206 via network 209. Network 209 may be any type of connection between exporting system 201 and importing system 206. The AESKW key token 204 is received by importing system 206 via network 209. Importing system 206 using key import function 205, which is located in an HSM 208 and is discussed in further detail below with respect to FIG. 3B, to unwrap the AESKW key token 204 and generate CCA key token 202B for use on importing system 206. CCA key token 202B on importing system 206 is securely stored in HSM 208 in some embodiments, and corresponds to CCA key token 202A on exporting system 201. In other embodiments, CCA key token 202B is encrypted and stored on importing system 208 outside of HSM 208. CCA key token 202B may be used for, for example, communication between exporting system 201 and importing system 206, or verification of sensitive data, such as personal identification numbers (PINs), on importing system 206.

Figure 3A:
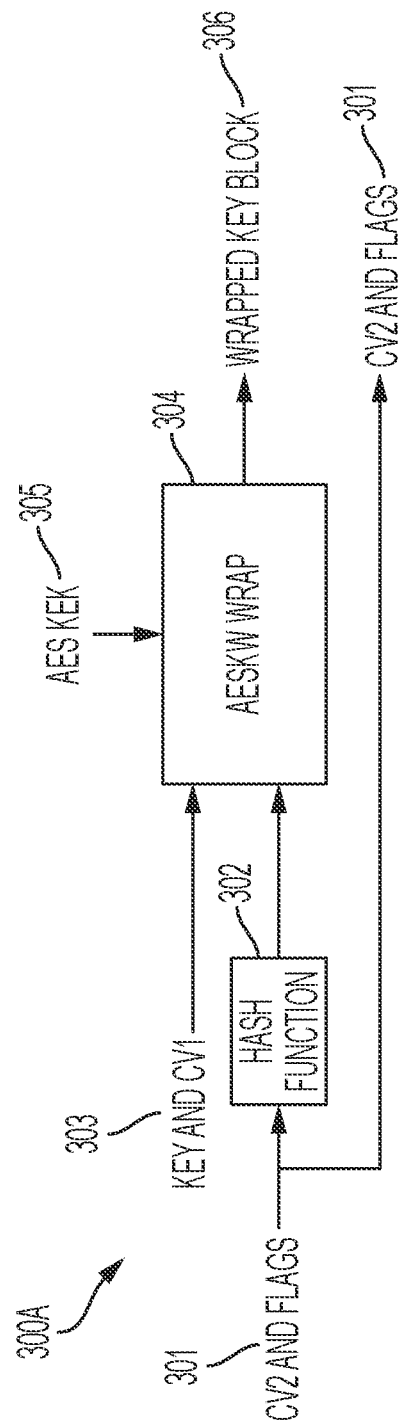
FIGS. 3A-B depict AESKW wrapping and unwrapping functions system for AES key wrapping for a CCA key token in accordance with one or more embodiments of the present invention.

FIG. 3A illustrates an embodiment of a key export function 300A, which may include key export function 203 of FIG. 2 and is discussed with respect to FIGS. 1 and 2. Key export function 300A may be implemented in an HSM 207 in exporting system 201 in some embodiments. Key export function 300A receives unencrypted key data 101 and CV1 102A from control vector 102 in CCA key token 100/202 as key and CV1 303. CV2 102B and flags 103 are received by key export function 300A as CV2 and flags 301, and a hash of CV2 and flags 301 is input into AESKW wrap 304 from hash function 302. In some embodiments, the hash function 302 may compress the CV2 and flags 301 using a secure hash algorithm (SHA)-256 hash function, providing a value short enough for input to the AESKW wrap 304. In some embodiments, hash function 302 may be omitted, and CV2 and flags 301 may be input directly into AESKW wrap 304 to create the associated data 106. The key and CV1 303 are encrypted by AESKW wrap 304 using AES KEK 305 to generate an encrypted key data 105 of wrapped key block 306, which includes an AESKW key token 104 as shown in FIG. 1. CV2 and flags 301 are not encrypted, but the hash of CV2 and flags 301 are included as associated data 106 in wrapped key block 306. CV2 and flags 301 are also bound to wrapped key block 306 by inclusion of binding information in the wrapped key block 306. CV2 and flags 301 are also transmitted as unencrypted plaintext along with wrapped key block 306 from exporting system 201 to importing system 206. The binding of CV2 and flags 301 to wrapped key block 306 ensures that any changes in the CV2 and flags 301, which may have occurred, for example, during transmission, will be detected.

Figure 3B:
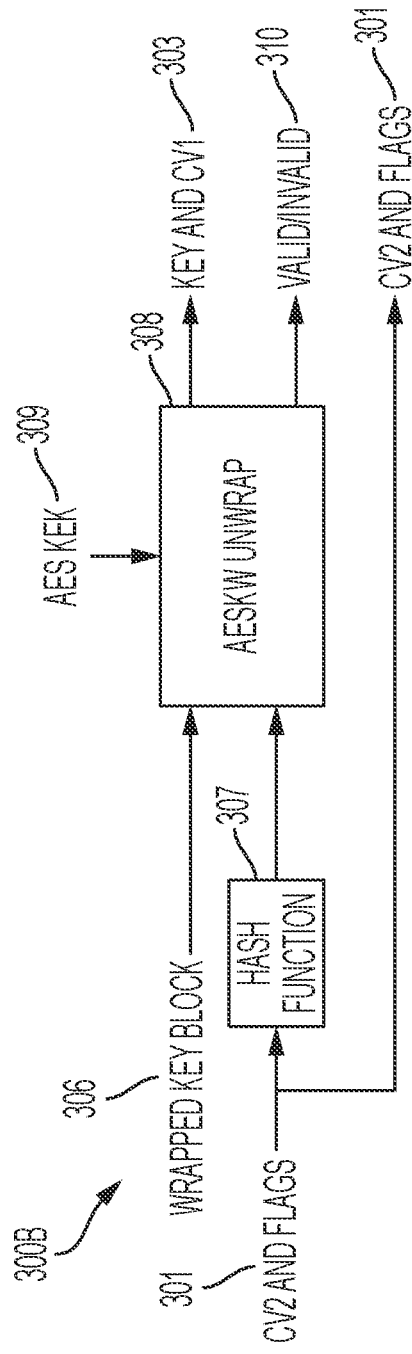

FIG. 3B illustrates an embodiment of a key import function 300B, which may include key import function 205 of FIG. 2 and is discussed with respect to FIGS. 1 and 2. Key import function 300B may be implemented in an HSM 208 in importing system 206 in some embodiments. Key import function 300B receives an AESKW key token 104/204 including wrapped key block 306, and plaintext CV2 and flags 301, which include associated data 106. The CV2 and flags 301 are hashed by hash function 307, and input to AESKW unwrap 308 along with the wrapped key block 306. Hash function 307 may be omitted, and CV2 and flags 301 may be input directly into AESKW unwrap 308. The wrapped key block 306 is decrypted by AESKW unwrap 308 using AES KEK 309 and output as key and CV1 303. The AESKW unwrap 308 also determines whether the CV2 and flags 301 were altered during transport based on the hash of CV2 and flags 301 and the binding information included in the wrapped key block 306. If it is determined that the CV2 and flags 301 were not altered, a valid flag is output at valid/invalid output 310 and the received key may be used by on importing system 206; otherwise, an invalid flag is output at valid/invalid output 310, and the received key is not used; in some embodiments, the AESKW unwrap 308 may not output key and CV1 303 based on an invalid flag. The key portion of key and CV1 303 includes unencrypted key data 101 of FIG. 1; CV1 (from key and CV1 303) and CV2 (from CV2 and flags 301) together include the control vector 102 of FIG. 1, and the flags from CV2 and flags 301 include flags 103 of a CCA key token 100/202.

It has been seen that in some cases, there can be a lack of integrity protection of the CV and an inability to obfuscate a key length.

One or more embodiments of the present invention address one or more of the above-described shortcomings of the prior art by providing an enhanced key wrapping (WRAPENH3) method that provides for integrity protection of the CV and key length obfuscation.

Sections below will refer to a DES key token structure, which is shown with updates for WRAPENH3.

| typedef struct _des_key_token_structure { } des_key_token_structure | | | |
|---|---|---|---|
| Offset | Len | field | Comment/definitions |
| 0 | 1 | UCHAR tokenFlag | internal/external<br>#define values:<br>EMPTY_TOKEN_FLAG 0x00<br>INTERNAL_TOKEN_FLAG 0x01<br>EXTERNAL_TOKEN_FLAG 0x02 |
| 1 | 1 | UCHAR reserved1 | reserved |
| 2 | 2 | UCHAR Oldmkvp[2] | MK verification pattern |
| 4 | 1 | UCHAR version | version number<br>#define values:<br>1. INTERNAL_VERSION_NUMBER 0x00<br>  a. supports WRAP-ENH<br>  b. only internal version with WRAPENH2<br>  c. only internal version with WRAPENH3<br>2. INTERNAL_VERSION_NUMBER_TDES 0x01<br>3. INTERNAL_VERSION_NUMBER_3 0x03 |

-continued

| Offset | Len | field | Comment/definitions |
|---|---|---|---|
| | | typedef struct _des_key_token_structure { } des_key_token_structure | |
| | | | 4. INTERNAL_VERSION_NUMBER_AES 0x04<br>5. EXTERNAL_VERSION_NUMBER 0x00<br>  a. supports WRAP-ENH<br>  b. only external version with WRAPENH2<br>  c. only external version with WRAPENH3<br>6. EXTERNAL_VERSION_NUMBER_1 0x01<br>7. EXTERNAL_RKX_VERSION_NUMBER 0x10 |
| 5 | 1 | UCHAR reserved2 | reserved |
| 6 | 1 | UCHAR flags (FLAGS-1) | key token flag byte<br>#define values:<br>MASK_KEY    0x80 // encrypted key & MKVP present<br>MASK_CV    0x40 // CV in token has been applied<br>S390-ONLY :: MASK_NOCV    0x20 // KEK used for NOCV processing<br>MASK_AKEK    0x10 // ANSI KEK (AKEK)<br>MASK_AKEK_DOUBLE    0x08 // AKEK is double-length key<br>MASK_AKEK_PART_NOTARIZED 0x04 // AKEK is partially notarized<br>MASK_ANSI_PARTIAL_KEY    0x02 // key is an ANSI partial key<br>MASK_XPORT_PROHIB    0x01 // prohibit export when bit is 0b1 |
| 7 | 1 | UCHAR flags2 (FLAGS-2) | key token flag2 byte<br>#define values:<br>1. bit 0-2: wrap method:<br>  a. '000xxxxx' WRAP_TK_LEGACY = 0,<br>    i. ECB/legacy method<br>  b. '001xxxxx' WRAP_TK_ENH_CBC = 1,<br>    i. Chain Keys with SHA-1, SHA-256 KDF->KEK, variant KEK, CBC encryption<br>  c. '010xxxxx' WRAP_TK_ENH_2 = 2,<br>    i. Chain Keys with SHA-256, SHA-256 KDF->KEK, variant KEK, CBC encryption<br>  d. '011xxxxx' WRAP_TK_ENH_3 = 3,<br>    i. Chain Keys with SHA-256, SHA-256 KDF->MAC key, TDES-CMAC, SHA-256 KDF->KEK, CBC encryption<br>2. bit 3-5: 'xxx000xx' reserved<br>3. bit 6: 'xxxxxx1x' used for legacy case<br>  a. pre-2009 code was not clear on how this is used, but it is checked<br>4. bit 7: 'xxxxxxx0' reserved |
| 8 | 8 | UCHAR mkvp[8] (KEKVP) | KEK or MK verification pattern |
| 16 | 8 | UCHAR keyLeft[8] (K1) | left (first or key 1) 8-byte key |
| 24 | 8 | UCHAR keyRight[8] (K2) | right (middle or key2) 8-byte key<br>For WRAPENH3, this field will always hold ciphertext in order to obfuscate the length of a single or double-length key. |
| 32 | 8 | UCHAR cvBase[8] (CV1) | CV base<br>For WRAPENH3, this field will will have an update to the key form bits (bits 40-42). These bits will always have the value '011', which indicates a triple-length key but without guaranteed unique halves. |
| 40 | 8 | UCHAR CMAC[8] (CV2) | For WRAPENH3, this field will hold an 8 byte TDES-CMAC over the entire key block, with this field set to 0x00 bytes before calculation of the TDES-CMAC. |
| 48 | 8 | UCHAR keyThird[8] (K3) | third (last/key3)8-byte key<br>For WRAPENH3, this field will always hold ciphertext in order to obfuscate the length of a single or double-length key |
| 56 | 3 | UCHAR reserved6[3] | reserved |

-continued

| | | typedef struct _des_key_token_structure { } des_key_token_structure | |
|---|---|---|---|
| Offset | Len | field | Comment/definitions |
| 59 | 1 | UCHAR tokenmarks (TM) | Token marks #define values: TM_KEY_LENGTH_SINGLE 0x00 TM_KEY_LENGTH_DOUBLE 0x10 TM_KEY_LENGTH_TRIPLE 0x20 TM_CDMF_DATA 0x80 TM_CDMF_KEK 0x80 TM_DES_DATA 0x00 TM_SYSTEM_DEFAULT_KEK 0x00 TM_DES_KEK 0x40 TM_KEY_LENGTH_MASK 0x30 TM_TOKEN_MARKS_MASK 0xC0 TM_TOKEN_MARKS_SINGLE_MASK 0xCF TM_RESERVED 0x0F |
| 60 | 4 | uint32_t tvv (TVV) | Token Validation Value |

The CCA cryptographic commands form a complete, consistent and secure command set that performs within tamper-resistant hardware. The cryptographic commands use a set of distinct DES key types that provide a secure cryptographic system that blocks many attacks that can be directed against it. CCA implementations use a control vector to separate fixed-length DES keys into distinct key types and to further restrict the use of a key. A control vector is a non-secret value that is carried in the clear in the DES/TDES key-token along with the encrypted key that it specifies.

A CV is cryptographically associated with a DES/TDES key by the key block wrapping method. This permanently binds the CV to the key wrapped in the key block. Any change to the original control vector would result in an error returned from the integrity check processing of the unwrapping process.

After a DES key is enciphered, the originator of the key can ensure that the intended use of the key is preserved by giving the key-encrypting key only to a system that implements the CCA control vector design and that is managed by an audited organization.

Checking a DES control vector before processing a cryptographic command.

Before a CCA cryptographic facility processes a command that uses a DES/TDES key, the facility's logic checks the control vector associated with the key. The control vector must indicate a valid key type for the requested command, and any control-vector restriction (key-usage) bits must be set appropriately for the command. If the command permits use of the control vector, the cryptographic facility unwraps the key and uses the key to process the command.

The control vector has sections for these purposes: General Key Management and Key type and key usage control. For general Key Management, these bytes have control bits which apply to multiple key types, such as import/export of the key. For key type and key usage control, these bytes indicate what services and operations the key may be used for.

General Key Management CV Bytes

The XPRTCPAC bit (bit 59) controls the export of TDEA keys using an intra-system service, and defaults to '0' which does not permit export. Notice the 'byte 0 . . . byte 7' numbering across the top. The breakdown for each byte for key type and usage, in general terms is: Byte 0: calculation/method bits, applicable for certain key types, Byte 1: key type and sub-type, Byte 2: usage or service control bits, along with export control and the bits in positions 16-22 and 33-37 generally have different meanings for every key class.

Key Type/Key Usage CV Bytes

The table below shows the default CV byte settings for the key types when generated or imported. The left half and right half are depicted.

| Time | CV | Description |
|---|---|---|
| | Key encrypting keys | |
| EXPORTER | 00 41 7D 00 03 41 00 A0 00 41 7D 00 03 21 00 A0 | Used to encrypt a key taken from this local node |
| IKEYXLAT | 00 42 42 00 03 41 00 A0 00 42 42 00 03 21 00 A0 | Used to decrypt an input key token in a key translation service that decrypts an external input key token under an IKEYXLAT KEK, then encrypts the key material as a new external output key token under an OKEYXLAT KEK. |
| IMPORTER | 00 42 7D 00 03 41 00 A0 00 42 7D 00 03 21 00 A0 | Used to decrypt a key brought to this local node. |
| OKEYXLAT | 00 41 42 00 03 41 00 A0 00 41 42 00 03 21 00 A0 | Used to encrypt an output key in a key translation service that decrypts an external input key token under an IKEYXLAT KEK, then encrypts the key material as a new external output key token under an OKEYXLAT KEK. |

-continued

| Time | CV | Description |
|---|---|---|
| | | Data protection keys |
| CIPHERXI | 00 0C 50 00 03 C0 00 A0<br>00 0C 50 00 03 A0 00 A0 | Used to decrypt ciphertext during text translation from 1 cipher key to another cipher key. |
| CIPHERXO | 00 0C 60 00 03 C0 00 A0<br>00 0C 60 00 03 A0 00 A0 | Used to encrypt ciphertext during text translation from 1 cipher key to another cipher key. |
| CIPHERXL | 00 0C 71 00 03 C0 00 A0<br>00 0C 71 00 03 A0 00 A0 | Used to decrypt or encrypt ciphertext during text translation. |
| CIPHER | 00 03 71 00 03 41 00 A0<br>00 03 71 00 03 21 00 A0 | Used only to encrypt or decrypt data. |
| DATAC | 00 00 71 00 03 41 00 A0<br>00 00 71 00 03 21 00 A0 | Used only to encrypt or decrypt data. |
| DECIPHER | 00 03 50 00 03 41 00 A0<br>00 03 50 00 03 21 00 A0 | Used only to decrypt data. |
| ENCIPHER | 00 03 60 00 03 41 00 A0<br>00 03 60 00 03 21 00 A0 | Used only to encrypt data. |
| | | Data integrity keys |
| DATAM | 00 00 4D 00 03 41 00 A0<br>00 00 4D 00 03 21 00 A0 | Used to generate or verify a MAC. |
| DATAMV | 00 00 44 00 03 41 00 A0<br>00 00 44 00 03 21 00 A0 | Used to verify a MAC code; cannot be used in MAC-generation |
| MAC | 00 05 4D 00 03 41 00 A0<br>00 05 4D 00 03 21 00 A0 | Used to generate or verify a MAC. |
| MACVER | 00 05 44 00 03 41 00 A0<br>00 05 44 00 03 21 00 A0 | Used to verify a MAC code; cannot be used in MAC-generation |
| | | PIN-processing keys |
| IPINENC | 00 21 5F 00 03 41 00 A0<br>00 21 5F 00 03 21 00 A0 | Inbound PIN encrypting key, used to decrypt a PIN block |
| OPINENC | 00 24 77 00 03 41 00 A0<br>00 24 77 00 03 21 00 A0 | Outbound PIN encrypting key, used to encrypt a PIN block |
| PINGEN | 00 22 7E 00 03 41 00 A0<br>00 22 7E 00 03 21 00 A0 | Used to generate and verify PIN values |
| PINVER | 00 22 42 00 03 41 00 A0<br>00 22 42 00 03 21 00 A0 | Used to verify, but not generate, PIN values |
| | | Key-generating keys |
| DKYGENKY | 00 71 44 00 03 41 00 A0<br>00 71 44 00 03 21 00 A0 | Used to generate a diversified key based on a key-generating key. |

Wrapping Operations

Figure 4:
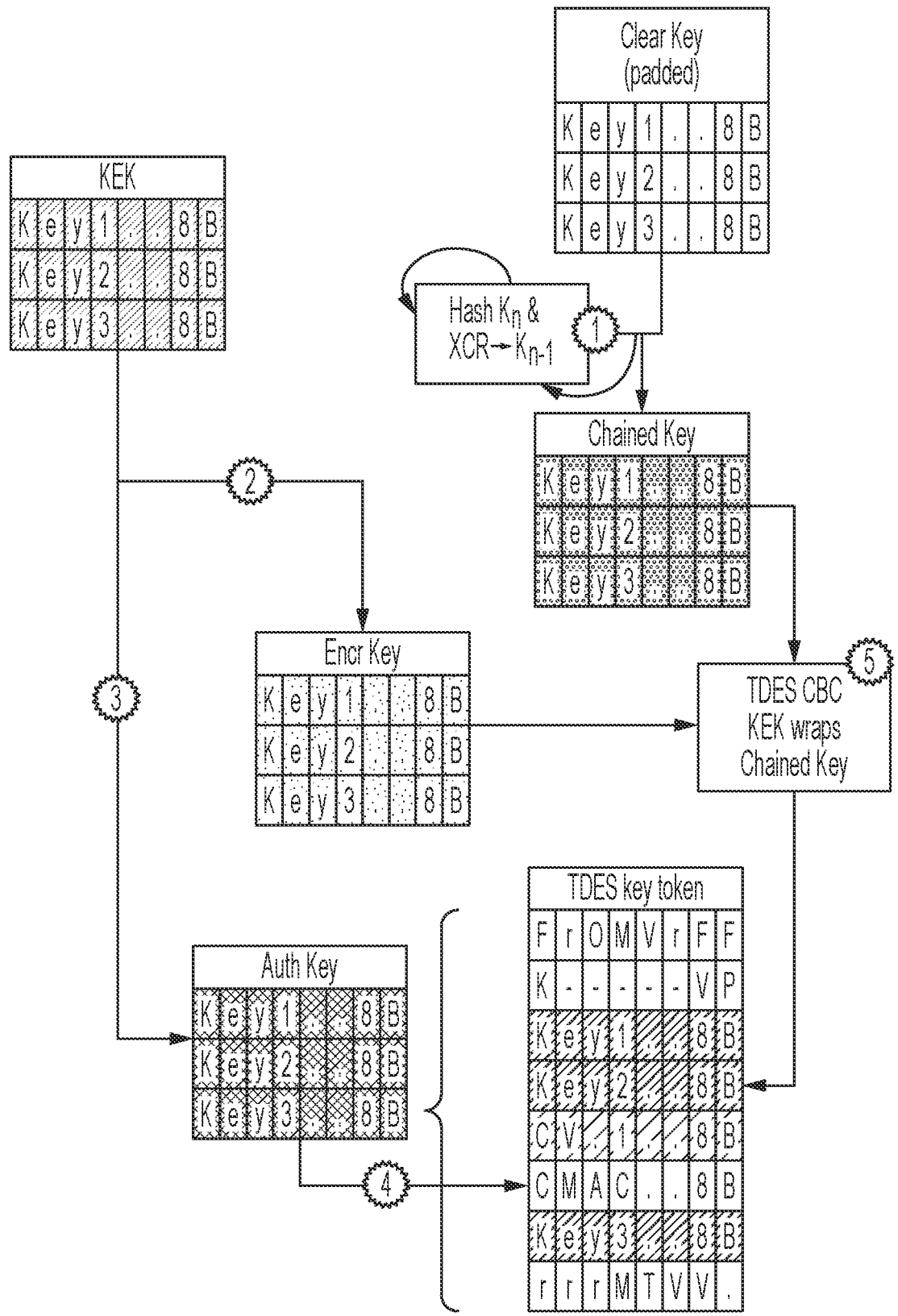
FIG. 4 is a graphical flow diagram depicting a method of enhanced key wrapping in accordance with one or more embodiments of the present invention.

With reference to FIG. 4, WRAPENH3 processing includes the following operations: chaining of key data (1), wrapping key derivation (2), TDES-CMAC key derivation (3), TDES-CMAC calculation (4) and CBC encryption of the key (5). The wrapping key and the TDES-CMAC key derivation operations use unique 16 labels as inputs to the key derivation function. The chaining of key data involves the use SHA-256 as a hash function for WRAPENH3. The TDES-CMAC calculation involves the calculation of TDES-CMAC over a full key block using a derived CMAC key, placed in a CV2 field.

The chaining of key data of operation (1) of FIG. 4.

The key to be wrapped (*K) is chained from right to left to create the chained key to be wrapped (*KC).

1. processing
   a. Keys are always wrapped as 168-bit keys
      i. keys shorter than 168-bits are padded to the right with 0x00 bytes.
   b. K3C=K3
   c. K2C=K2^ hash(K3)
      i. ensure that K2 and K3 parity are adjusted
   d. K1C=K1^ hash(K2)
      i. ensure that K1 parity is adjusted
   e. *KC=K1C∥K2C∥K3C 2. where:
   a. ^ means bitwise exclusive OR
   b. ∥ means concatenation
   c. hash is a hash function that depends on the algorithm
      i. For WRAPENH3: hash=SHA-256

The wrapping key derivation of operation (2) of FIG. 4.

A derived wrapping key is input to the wrapping process used for the target key token. The derived wrapping key is derived by a derivation process that makes use of a 16-byte string that is unique to the key hierarchy being implemented. For WRAPENH3, the wrapping key Derivation Label is a unique 16-byte label. The key is derived using a method defined in the U.S. National Institute of Standards and Technology (NIST) standard SP 800-108, Recommendation for Key Derivation Using Pseudorandom Functions (October, 2009). Derivation will use the method KDF in counter mode using pseudo-random function (PRF) HMAC-SHA256. The (PRF) HMAC-SHA256 algorithm provides sufficient strength for deriving keys for any algorithm used. The HMAC algorithm is defined as:

a. HMAC(K, text)=H((K0 XOR opad)∥H((K0 XOR ipad)∥text))
b. Where:
   i. H Is an approved hash function.
   ii. K Is a secret key shared between the originator and the intended receivers.
   iii. K0 The key K after any necessary preprocessing to form a key of the proper length.

iv. ipad Is the constant X'36' repeated to form a string the same length as K0
v. opad Is the constant X'5C' repeated to form a string the same length as K0 text Is the text to be hashed.
vi. || Means concatenation
vii. XOR Means bitwise exclusive OR
c. If the key K is equal in length to the input block size of the hash function (512 bits for SHA-256), K0 is set to the value of K. Otherwise, K0 is formed from K by hashing or padding.

The NIST Key Derivation Function (KDF) specification calls for inputs optionally including two byte strings, Label and Context. The Context will not be used. Because the security of the derivation process is rooted in the security of the derivation key and in the HMAC and Key Derivation Functions (KDF) themselves, it is not necessary for this label string to be of any particular minimum size. The separation indicator byte of X'00' specified in the NIST document will follow the label.
a. The label used is specific to the wrapping method used in the token.
b. The parameters for the counter mode KDF defined in NIST standard SP 800-108 are:
   i. Fixed values:
      1. h Length of output of PRF, 256 bits
      2. r Length of the counter, in bits, 32. The counter will be an unsigned 4-byte value.
   ii. Inputs:
      1. KI (input key)—The key we are deriving from. This is the input Master Key or KEK.
      2. Label—as shown above mapping to the KDF value
      3. Separator byte—X'00' following the label value.
      4. Context—A null string. No context is used.
      5. L—The length of the derived key to be produced, rounded up to the next multiple of 256.
      6. PRF—HMAC-SHA256.

The TDES-CMAC of operation (3) of FIG. 4.

The derived TDES-CMAC key is used to create the TDES-CMAC over the target key token. This operation is the same as for WRAPENH3 "Wrapping Key Derivation", with a different Derivation Label. The wrapping key and the TDES-CMAC key are not allowed to be related except by an irreversible process. The derivation process makes use of a 16-byte string that is unique to the key hierarchy being implemented. For WRAPENH3, the TDES-CMAC key Derivation Label is a unique 16-byte label.

The TDES-CMAC calculation of operation (4) of FIG. 4.

A TDES-CMAC is calculated over the completed key block and placed in the CV2 position (offset 40). Processing is as follows:
1. fill out key block with
   a. normal values for:
      i. tokenFlag,
      ii. reserved1,
      iii. Oldmkvp,
      iv. version (0x00),
      v. reserved2,
      vi. flags,
      vii. mkvp,
   b. set to 0x00
      i. CV2/CMAC field,
      ii. tokenmarks,
      iii. tvv
   c. flags2 has '3', binary '011', in bits 0-2, 0b0 in remaining bits
   d. CV1 is in place but with key form set to '011' in all cases
   e. clear key values as follows
      i. K1,
      ii. K2 (or bytes of zeroes, for single-length keys) in K2 position
         1. never set K2=K1 when storing a double-length key, this weakens the key because K1 and K2 cancel each other out, which turns a key that looks double-length key into an actual single-length key
      iii. K3 (or bytes of zeroes, for a single or double-length key) in the K3 position
2. calculate 8 Byte TDES-CMAC over full key block using derived CMAC key from the "TDES-CMAC Key Derivation" step.
3. put 8 byte TDES-CMAC in CV2 field The CBC encryption of the Key of operation (5) of FIG. 4.

Encryption of the Key being wrapped proceeds with *KEKC and *K as follows:

$$e*KEK(*KC) = ecbc_{KEK3}(dcbc_{KEK2}(ecbc_{KEK1}(K1C \| K2C \| K3C)))$$

Where:
1. K1C, K2C, K3C are the modified sections of *KC from the "Chaining of key data" step
2. KEK1, KEK2, KEK3 are the sections of *KEK output from the "Wrapping key derivation" step
   a. There is no XOR of content into *KEK, no key variant is created for use as the wrapping key
   b. for 112-bit *KEKs, KEK1 is used for KEK3
3. || means concatenation
4. ecbc means encryption using cipher block chaining mode
5. dcbc means decryption using cipher block chaining mode.
6. 8 bytes of 0x00 are used for the Initialization Vector for encryption0

Figure 5:
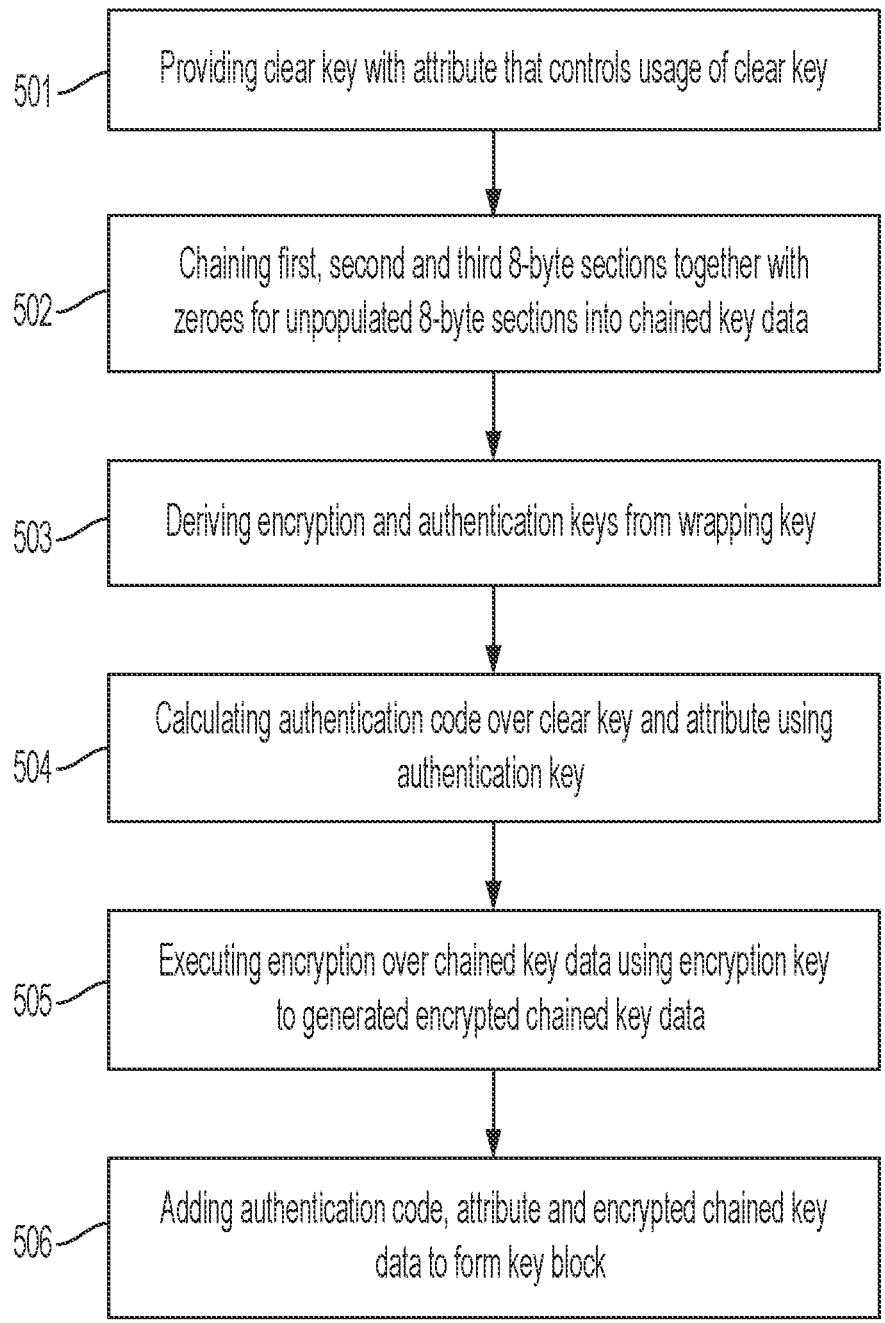
FIG. 5 is a flow diagram depicting a method of enhanced key wrapping in accordance with one or more embodiments of the present invention.

With reference to FIG. 5, a method of enhanced key wrapping is provided and includes providing a clear key with an attribute that controls usage of the clear key (501). The clear key includes key data in at least a first 8-byte section and second and third 8-byte sections that are populated with key data or are unpopulated and a wrapping key for wrapping the clear key. The method further includes chaining the first, second and third 8-byte sections together with zeroes for those 8-byte sections that are unpopulated into chained key data (502), deriving encryption and authentication keys from the wrapping key (503), calculating an authentication code over the clear key and the attribute using the authentication key (504), executing encryption over the chained key data using the encryption key to generated encrypted chained key data (505) and adding the authentication code, the attribute and the encrypted chained key data to form a key block (506).

In accordance with one or more embodiments of the present invention, the attribute can include a set of attributes that control how the clear key is to be used. Also, the wrapping key can be derived using at least one of a pseudo random function (PRF) algorithm and a key derivation function (KDF) algorithm. In addition, the authentication code can be a triple-length data encryption standard cipher-based message authentication code (TDES-CMAC) and the encryption includes cipher block chaining (CBC) encryption.

Figure 6:
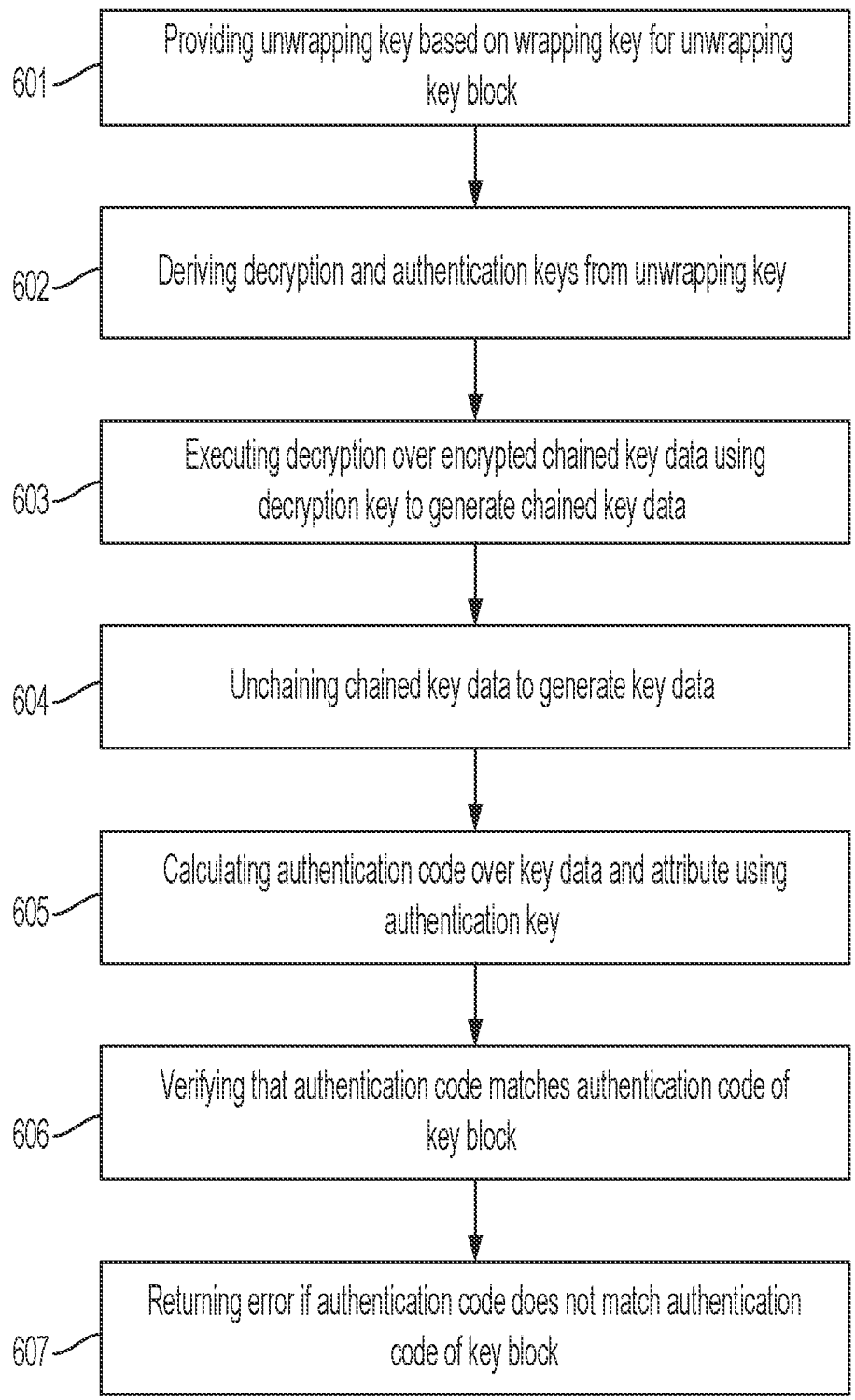
FIG. 6 is a flow diagram depicting a method of enhanced key unwrapping in accordance with one or more embodiments of the present invention.

With reference to FIG. 6 and, in accordance with further embodiments of the present invention, the method can further include an unwrapping of the key block. As shown in FIG. 6, the unwrapping of the key block includes providing an unwrapping key based on the wrapping key for unwrapping the key block (601), deriving decryption and authentication keys from the unwrapping key (602), executing decryption over the encrypted chained key data using the decryption key to generate chained key data (603), unchaining the chained key data to generate key data (604) and calculating an authentication code over the key data and the attribute using the authentication key (605). The unwrapping of the method can also include verifying that the authentication code matches the authentication code of the key block (606) and returning an error if/in an event the authentication code does not match the authentication code of the key block (607).

Figure 7:
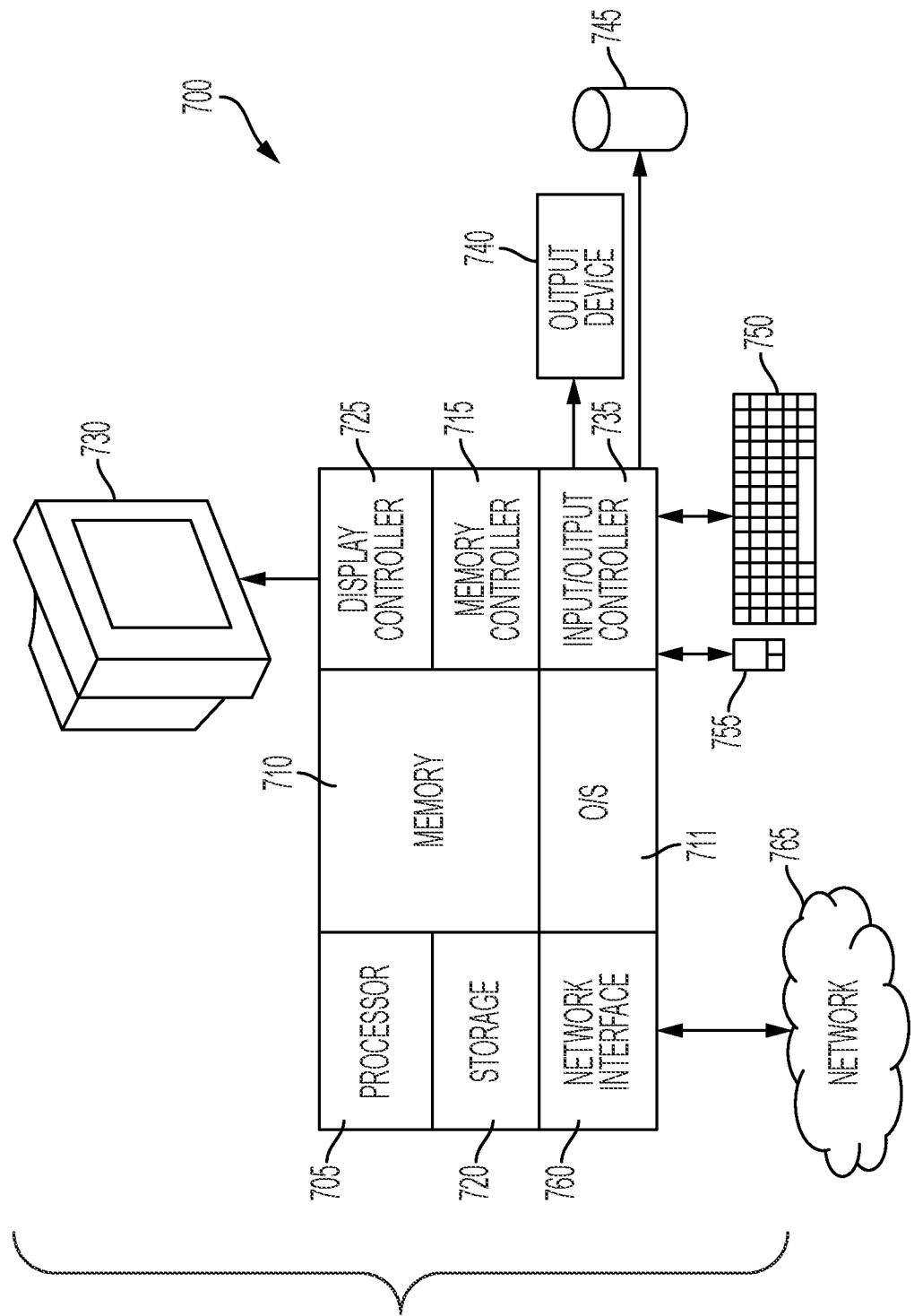
FIG. 7 depicts a computer system for executing in accordance with one or more embodiments of the present invention.

Turning now to FIG. 7, a computer system 700 for enhanced key wrapping. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore may include general-purpose computer or mainframe capable of running multiple instances of an O/S simultaneously.

In an exemplary embodiment, in terms of hardware architecture, as shown in FIG. 7, the computer includes one or more processors 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.))

Clean Copy Application and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 form a suitable operating system (OS) 711. The operating system 711 essentially controls the execution of other computer programs and provides scheduling, input-output control, file and data management, memory management, and communication control and related services.

The memory 710 may include multiple logical partitions (LPARs), each running an instance of an operating system. The LPARs may be managed by a hypervisor, which may be a program stored in memory 710 and executed by the processor 705.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer and any external server, client and the like via a broadband connection. The network 765 transmits and receives data between the computer and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer is activated.

When the computer is in operation, the processor 705 is configured to execute instructions stored within the memory 710, to communicate data to and from the memory 710, and to generally control operations of the computer pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only Clean Copy Application memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of enhanced key wrapping, the computer-implemented method comprising:
    providing a clear key with an attribute that controls usage of the clear key, wherein the attribute comprises a clear text part and an encrypted part, wherein during wrapping indications of a key length are moved from the clear text part to the encrypted part, the clear key comprising: key data in at least a first 8-byte section and second and third 8-byte sections, all of which are always populated with encrypted data; and
    a wrapping key for wrapping the clear key, wherein:
    the second 8-byte section is derived from the second 8-byte section having a bitwise exclusive OR applied thereto with respect to a hashing of the third 8-byte section and with parities of the second and third 8-byte sections being adjusted, and
    the first 8-byte section is derived from the first 8-byte section having a bitwise exclusive OR applied thereto with respect to a hashing of the second 8-byte section and with a parity of the first 8-byte section being adjusted;
    chaining to bind the first, second and third 8-byte sections together with zeroes for padding portions of those 8-byte sections that are unpopulated into chained key data of always 168 total bits, wherein the clear key is wrapped with 168 bits;

deriving both an encryption key and an authentication key from the wrapping key, wherein the wrapping key derivation includes using a National Institute of Standards and Technology (NIST) key derivation algorithm, defined in NIST standard SP 800-108, and unique labels specific to a wrapping method as inputs to the key derivation algorithm;

first calculating an authentication code over the clear key and the attribute using the authentication key;

executing encryption over the chained key data using the encryption key to generate encrypted chained key data; and adding the authentication code, the attribute and the encrypted chained key data to form a key block.

2. The computer-implemented method according to claim 1, wherein the attribute comprises a set of attributes that control how the clear key is to be used.

3. The computer-implemented method according to claim 1, wherein the wrapping key is derived using a selection from a group consisting of a pseudo random function (PRF) algorithm and a key derivation function (KDF) algorithm.

4. The computer-implemented method according to claim 1, wherein the authentication code is a triple-length data encryption standard cipher-based message authentication code (TDES-CMAC).

5. The computer-implemented method according to claim 1, wherein the encryption comprises cipher block chaining (CBC) encryption.

6. The computer-implemented method according to claim 1, further comprising unwrapping the key block, the unwrapping of the key block comprising: providing an unwrapping key based on the wrapping key for unwrapping the key block; deriving decryption and authentication keys from the unwrapping key; executing decryption over the encrypted chained key data using the decryption key to generate chained key data; unchaining the chained key data to generate key data; and second calculating an authentication code over the key data and the attribute using the authentication key.

7. The computer-implemented method according to claim 6, wherein the unwrapping further comprises: verifying that the second calculated authentication code matches the first calculated authentication code of the key block; and returning an error in an event the second calculated authentication code does not match the first calculated authentication code of the key block.

8. A computer program product for enhanced key wrapping comprising a computer readable storage medium having program instructions embodied therewith, the program instructions executable by a processor to cause the processor to perform operations comprising:

providing a clear key with an attribute that controls usage of the clear key, wherein the attribute comprises a clear text part and an encrypted part, wherein during wrapping indications of a key length are moved from the clear text part to the encrypted part, the clear key comprising: key data in at least a first 8-byte section and second and third 8-byte sections, all of which are always populated with encrypted data; and a wrapping key for wrapping the clear key, wherein:

the second 8-byte section is derived from the second 8-byte section having a bitwise exclusive OR applied thereto with respect to a hashing of the third 8-byte section and with parities of the second and third 8-byte sections being adjusted, and the first 8-byte section is derived from the first 8-byte section having a bitwise exclusive OR applied thereto with respect to a hashing of the second 8-byte section and with a parity of the first 8-byte section being adjusted;

chaining to bind the first, second and third 8-byte sections together with zeroes for padding portions of those 8-byte sections that are unpopulated into chained key data of always 168 total bits, wherein the clear key is wrapped with 168 bits;

deriving both an encryption key and an authentication key from the wrapping key, wherein the wrapping key derivation includes using a National Institute of Standards and Technology (NIST) key derivation algorithm, defined in NIST standard SP 800-108, and unique labels specific to a wrapping method as inputs to the key derivation algorithm;

first calculating an authentication code over the clear key and the attribute using the authentication key;

executing encryption over the chained key data using the encryption key to generate encrypted chained key data; and adding the authentication code, the attribute and the encrypted chained key data to form a key block.

9. The computer program product according to claim 8, wherein the attribute comprises a set of attributes that control how the clear key is to be used.

10. The computer program product according to claim 8, wherein the wrapping key is derived using a selection from a group consisting of a pseudo random function (PRF) algorithm and a key derivation function (KDF) algorithm.

11. The computer program product according to claim 8, wherein the authentication code is a triple-length data encryption standard cipher-based message authentication code (TDES-CMAC).

12. The computer program product according to claim 8, wherein the encryption comprises cipher block chaining (CBC) encryption.

13. The computer program product according to claim 8, further comprising unwrapping the key block, the unwrapping of the key block comprising: providing an unwrapping key based on the wrapping key for unwrapping the key block; deriving decryption and authentication keys from the unwrapping key; executing decryption over the encrypted chained key data using the decryption key to generate chained key data; unchaining the chained key data to generate key data; and second calculating an authentication code over the key data and the attribute using the authentication key.

14. The computer program product according to claim 13, wherein the unwrapping further comprises: verifying that the second calculated authentication code matches the first calculated authentication code of the key block; and returning an error in an event the second calculated authentication code does not match the first calculated authentication code of the key block.

15. A system for enhanced key wrapping comprising: a memory having computer readable instructions; and one or more processors for executing the computer readable instructions, the computer readable instructions controlling the one or more processors to perform operations comprising:

providing a clear key with an attribute that controls usage of the clear key, wherein the attribute comprises a clear text part and an encrypted part, wherein during wrapping indications of a key length are moved from the clear text part to the encrypted part, the clear key comprising: key data in at least a first 8-byte section and second and third 8-byte sections, all of which are always populated with encrypted data; and
a wrapping key for wrapping the clear key, wherein:
the second 8-byte section is derived from the second 8-byte section having a bitwise exclusive OR applied thereto with respect to a hashing of the third 8-byte section and with parities of the second and third 8-byte sections being adjusted, and
the first 8-byte section is derived from the first 8-byte section having a bitwise exclusive OR applied thereto with respect to a hashing of the second 8-byte section and with a parity of the first 8-byte section being adjusted;
chaining to bind the first, second and third 8-byte sections together with zeroes for padding portions of those 8-byte sections that are unpopulated into chained key data of always 168 total bits, wherein the clear key is wrapped with 168 bits;
deriving both an encryption key and an authentication key from the wrapping key, wherein the wrapping key derivation includes using a National Institute of Standards and Technology (NIST) key derivation algorithm, defined in NIST standard SP 800-108, and unique labels specific to a wrapping method as inputs to the key derivation algorithm;
first calculating an authentication code over the clear key and the attribute using the authentication key;
executing encryption over the chained key data using the encryption key to generate encrypted chained key data; and
adding the authentication code, the attribute and the encrypted chained key data to form a key block.

16. The system according to claim 15, wherein the attribute comprises a set of attributes that control how the clear key is to be used.

17. The system according to claim 15, wherein the wrapping key is derived using a selection from a group consisting of a pseudo random function (PRF) algorithm and a key derivation function (KDF) algorithm.

18. The system according to claim 15, wherein the authentication code is a triple-length data encryption standard cipher-based message authentication code (TDES-CMAC).

19. The system according to claim 15, wherein the encryption comprises cipher block chaining (CBC) encryption.

20. The system according to claim 15, further comprising unwrapping the key block, the unwrapping of the key block comprising: providing an unwrapping key based on the wrapping key for unwrapping the key block; deriving decryption and authentication keys from the unwrapping key; executing decryption over the encrypted chained key data using the decryption key to generate chained key data; unchaining the chained key data to generate key data; second calculating an authentication code over the key data and the attribute using the authentication key; verifying that the second calculated authentication code matches the first calculated authentication code of the key block; and returning an error in an event the second calculated authentication code does not match the first calculated authentication code of the key block.

* * * * *